US009289839B2

(12) United States Patent
Stadtfeld et al.

(10) Patent No.: US 9,289,839 B2
(45) Date of Patent: Mar. 22, 2016

(54) METHOD FOR MANUFACTURING BEVEL GEARS (75) Inventors: Hermann J. Stadtfeld, Webster, NY (US); Mark J. Boch, East Rochester, NY (US); William G. Landry, Canandaigua, NY (US); Andrew S. Price, Meridian, ID (US); Joseph A. Courtney, Rochester, NY (US); Markus J. Bolze, Rochester, NY (US)

(73) Assignee: THE GLEASON WORKS, Rochester, NY (US)

( * ) Notice: Subject to any disclaimer, the term of this patent is extended or adjusted under 35 U.S.C. 154(b) by 880 days.

(21) Appl. No.: 13/512,733

(22) PCT Filed: Dec. 20, 2010

(86) PCT No.: PCT/US2010/061292
§ 371 (c)(1),
(2), (4) Date: May 30, 2012

(87) PCT Pub. No.: WO2011/087759
PCT Pub. Date: Jul. 21, 2011

(65) Prior Publication Data
US 2012/0230791 A1 Sep. 13, 2012

Related U.S. Application Data (60) Provisional application No. 61/289,102, filed on Dec. 22, 2009.

(51) Int. Cl.
*B23F 17/00* (2006.01)
*B23F 9/10* (2006.01)
*B23F 19/10* (2006.01)
*B23F 23/12* (2006.01)

(52) U.S. Cl.
CPC ............... *B23F 17/006* (2013.01); *B23F 9/10* (2013.01); *B23F 19/10* (2013.01);
(Continued)

(58) Field of Classification Search
CPC .......... B23F 9/10; B23F 17/006; B23F 19/10; B23F 23/1237; Y10T 29/5176; Y10T 29/49462; Y10T 29/49467; Y10T 29/49476; Y10T 409/101113; Y10T 409/101272; Y10T 409/103816; Y10T 409/103975; Y10T 409/104134
USPC .......... 29/27 A, 27 C, 27 R, 56.5, 893, 893.3, 29/893.35; 409/8, 9, 25, 26, 27
See application file for complete search history.

(56) References Cited

U.S. PATENT DOCUMENTS 3,129,638 A * 4/1964 Husby ............................. 409/8
4,012,990 A * 3/1977 Wagner ........................... 409/8
(Continued)

FOREIGN PATENT DOCUMENTS

DE 1284256 B 11/1968
DE 19744486 A1 * 4/1999
(Continued)

OTHER PUBLICATIONS

International Search Report and Written Opinion for PCT/US2010/061292, (Mar. 10, 2011).

*Primary Examiner* — Erica E Cadugan
*Assistant Examiner* — Michael Vitale
(74) *Attorney, Agent, or Firm* — Robert L. McDowell (57) ABSTRACT Method and apparatus wherein the front machining of a gear blank (40) are carried out on a CNC bevel gear generating machine (44) utilizing the motions available in such machines with minimal modifications to the existing machine tool.

5 Claims, 12 Drawing Sheets (52) U.S. Cl.
CPC ...... *B23F 23/1237* (2013.01); *Y10T 29/49476* (2015.01); *Y10T 29/5114* (2015.01); *Y10T 29/5176* (2015.01); *Y10T 409/101272* (2015.01); *Y10T 409/101431* (2015.01); *Y10T 409/103975* (2015.01); *Y10T 409/104134* (2015.01)

(56) References Cited

U.S. PATENT DOCUMENTS

| | | | |
|---|---|---|---|
| 2003/0041706 A1* | 3/2003 | Sugiura et al. | 82/1.11 |
| 2007/0020058 A1* | 1/2007 | Peiffer et al. | 409/8 |
| 2007/0283545 A1* | 12/2007 | Langerfeld | 29/56.5 |
| 2008/0152446 A1* | 6/2008 | Muller et al. | 409/50 |
| 2008/0213055 A1 | 9/2008 | Ozdyk et al. | |

FOREIGN PATENT DOCUMENTS

| | | |
|---|---|---|
| DE | 10109117 C1 | 7/2002 |
| EP | 1864739 A1 | 12/2007 |
| JP | 10180542 A * | 7/1998 |

* cited by examiner

METHOD FOR MANUFACTURING BEVEL GEARS

FIELD OF THE INVENTION

The present invention is directed to the production of bevel gears and in particular to the formation of a final dimensioned gear blank and a cut gear on a gear cutting machine in a single chucking.

BACKGROUND OF THE INVENTION

Bevel gears blanks (i.e. ring gear and pinion), in particular ring gear blanks, are usually manufactured from forgings. The forgings include an amount of excess stock material so as to allow for machining in order to clean up the blank surface and achieve the correct blank dimensions.

Gear blank forgings are often dimensioned such that they can be used for all members of a part (i.e. gear) family. In this case, the stock allowance can be several millimeters. In the case of pinion members of part families, the pinion shank design is usually identical for all different members of the part family and only the pinion head (diameter, face angle etc.) varies among family members. The ring gears members of part families usually have an identical bore and back face geometry (e.g. bolt hole pattern, tapping, inner and outer diameter of the back face) while the front inside surface, front face and front outside surfaces usually vary among family members.

Pinion blanks are usually turned in one chucking (i.e. positioning and securing a workpiece for machining on a machine tool) between centers while ring gear blanks are usually turned in at least two chuckings. Smaller ring gears are mostly turned in two-spindle CNC lathes (i.e. two chuckings) while larger ring gears (e.g. diameter 400 mm and above) are often turned in two or even three separate machines (i.e. two or more chuckings). Subsequent to such machining, the gear blank is usually transferred to a bevel gear cutting machine where the teeth of the gear are formed.

As an alternative to multiple machines for blank machining and tooth cutting, US 2008/0152446 to Muller et al. teach a device for performing green machining of a bevel gear blank (e.g. drilling, turning, milling, etc.) at a pre-machining station followed by transfer of the gear blank to an adjacent machining station for cutting the bevel gear teeth.

Also, US 2008/0213055 to Ozdyk et al. teach a device for the soft machining of bevel gears comprising a lathe arrangement having a tool base and a tool housing both of which are translatable at least horizontally in the X and Y directions on the base of the lathe. The tool base comprises a tool carriage and a tool holder that is rotatable about an axis B2 with at least one tool (e.g. turning, drilling, etc.) being positioned on the tool holder for machining a gear blank. At least one of the tools on the tool holder is separately rotatable about another axis B4 arranged generally parallel to the tool holder axis B2. The tool housing includes a milling head comprising a gear cutting tool which is rotatable about an axis B3.

In an alternative embodiment presented by US 2008/0213055, a combined tool holder/tool housing arrangement on the lathe is discussed wherein the tools (e.g. turning, drilling, etc.) and the milling head are located on the rotatable tool holder with milling cutter axis B3 being positioned separate from but parallel to axes B2 and B4 and the tool carriage being made to pivot about yet another axis B5. However, with this alternative embodiment, machine stiffness and cutting precision is diminished due to the plurality of linear and rotational axes of the tool holder/tool housing involved in positioning the carriage, tools and milling cutter and rotating the tools and milling cutter. Furthermore, considerable time is dedicated to preparation of the gear blank and as such, actual gear cutting time on the machine is lessened.

Turning of a ring gear blank in two or more chuckings is time consuming, costly and in many cases leads to undesirable runout and inaccuracy of the bore, back face and front face. Inaccuracy and runout in the front face can lead to mesh interferences of the final bevel gear pair. Such interferences can cause a failure of a gear set. It would be advantageous, with respect to the manufacturing flexibility and economy as well as part quality, if ring gear and pinion blanks would only have to undergo a single chucking in a CNC lathe, preferably to machine those surfaces common to all members of the part (gear) family (no machining of the surfaces which vary within the part family). In the case of part families, the inventory of blanks could be minimized since subsequent front turning operations could be utilized to produce a blank of a desired size.

SUMMARY OF THE INVENTION

The present invention is directed to a method and apparatus wherein the front machining of a gear blank are carried out on a CNC bevel gear generator utilizing the motions available in such machines with minimal modifications to the existing machine tool.

DETAILED DESCRIPTION OF THE PREFERRED EMBODIMENT

Before any features and at least one construction of the invention are explained in detail, it is to be understood that the invention is not limited in its application to the details of construction and the arrangements of the components set forth in the following description or illustrated in the drawings. The invention is capable of other constructions and of being practiced or being carried out in various ways. Also, it is understood that the phraseology and terminology used herein is for the purposes of description and should not be regarded as limiting. In the context of the present invention, the term "bevel" gears is understood to be of sufficient scope to include those types of gears known as bevel gears (ring gears and pinions), "hypoid" gears, as well as those gears known as "crown" or "face" gears.

The use of "including", "having" and "comprising" and variations thereof is meant to encompass the items listed thereafter and equivalents thereof as well as additional items. Although references may be made below to directions such as upper, lower, upward, downward, rearward, bottom, top, front, rear, etc., in describing the drawings, there references are made relative to the drawings (as normally viewed) for convenience. These directions are not intended to be taken literally or limit the present invention in any form.

As mentioned above, preparation of a gear blank in one, two or more chuckings on a lathe is well known in the art. Such a method, comprising two chuckings, for preparing a ring gear blank is shown, for example, in FIGS. 1-6.

Figure 1:
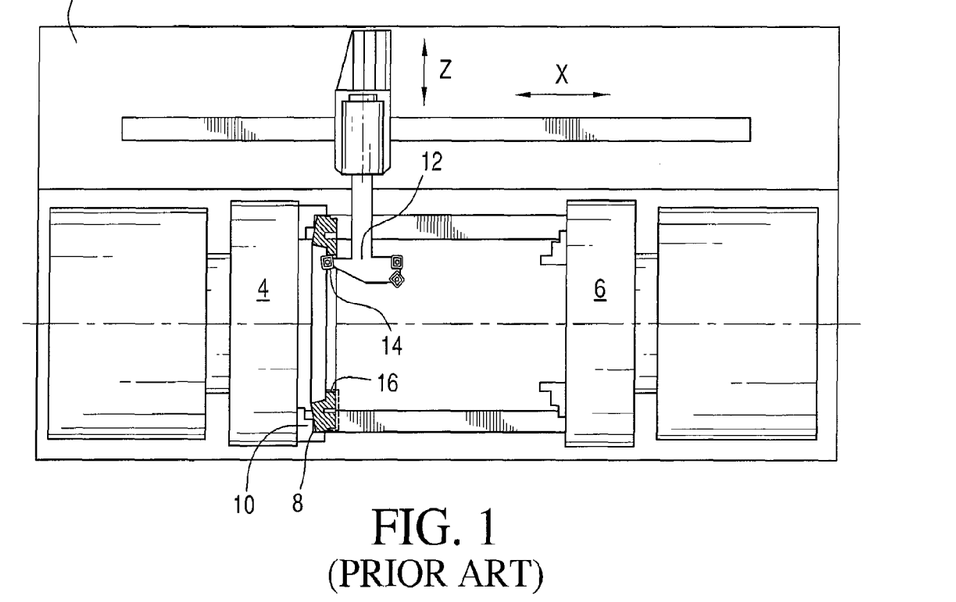
FIG. 1 shows a 2-spindle CNC lathe with a ring gear forging clamped in the left side chuck on the left spindle. The left insert is turning the inside bore of the forging.
Figure 2:
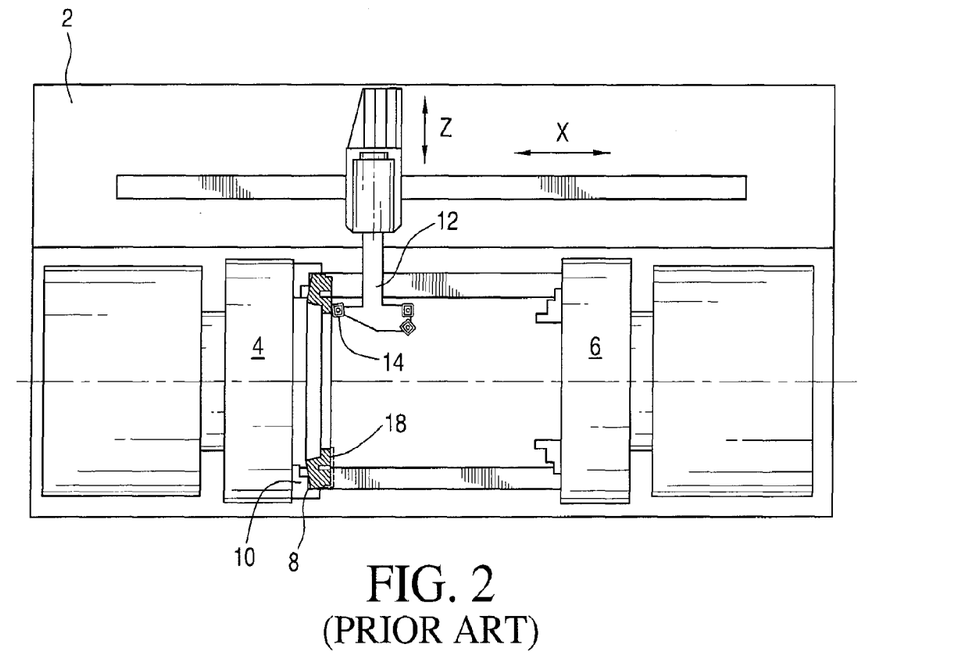
FIG. 2 shows the same lathe as in FIG. 1 wherein the left insert is turning the back face of the forging with a different cutting edge.
Figure 3:
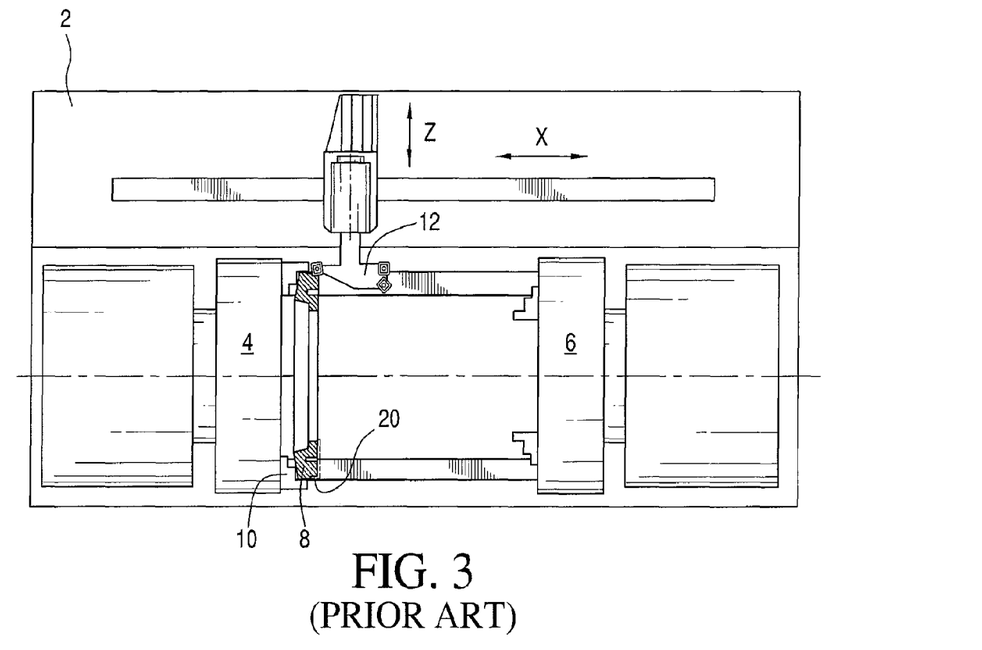
FIG. 3 shows the same lathe as in FIG. 1 wherein the left insert is turning the back outside diameter of the forging.

FIG. 1 shows a CNC lathe 2 having two spindles 4, 6 with a ring gear forging 8 clamped in the left side chuck 10 on the left spindle 4. The universal tool holder 12 can move at least in the two directions (X, Z) given by the drawing plane. The left insert 14 is turning the inside bore 16 of the forging 8. FIG. 2 shows turning the back face 18 of the forging 8 with a different cutting edge of the left insert 14. In FIG. 3, the left insert 14 is turning the back outside diameter 20 of the forging 8.

Figure 4:
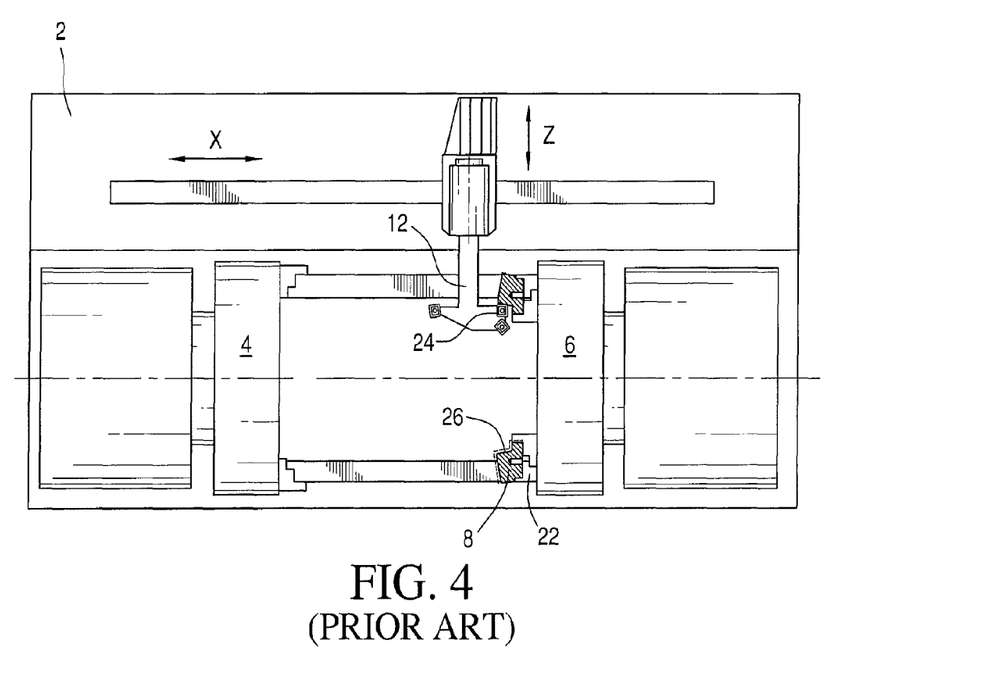
FIG. 4 shows the same lathe as in FIG. 1 wherein the ring gear forging clamped in the right side chuck on the right spindle. The universal tool holder uses the right upper insert to turn the front inside of the ring gear blank (front angle).
Figure 5:
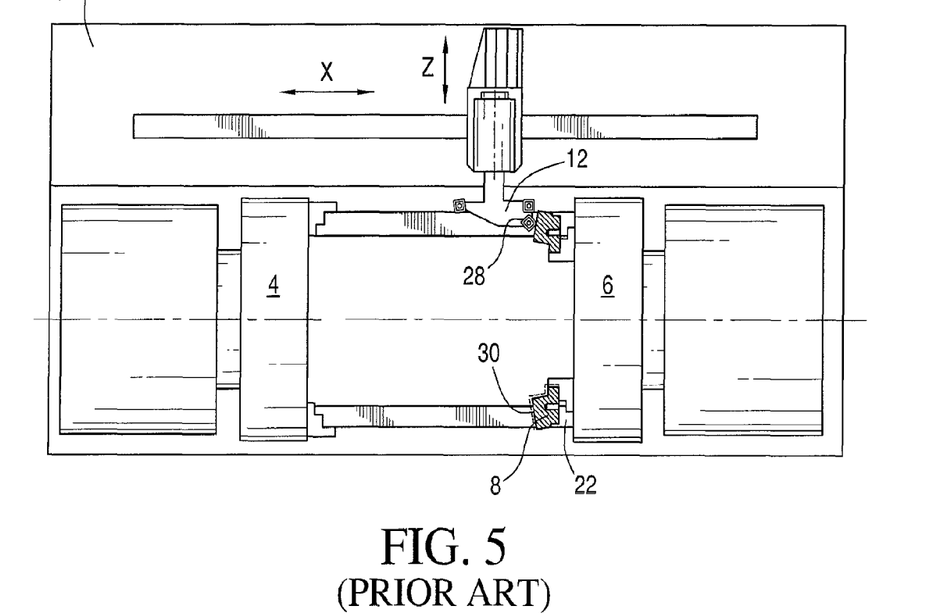
FIG. 5 shows the same arrangement as in FIG. 4 wherein the lower right insert is turning the front face of the ring gear blank (face angle).
Figure 6:
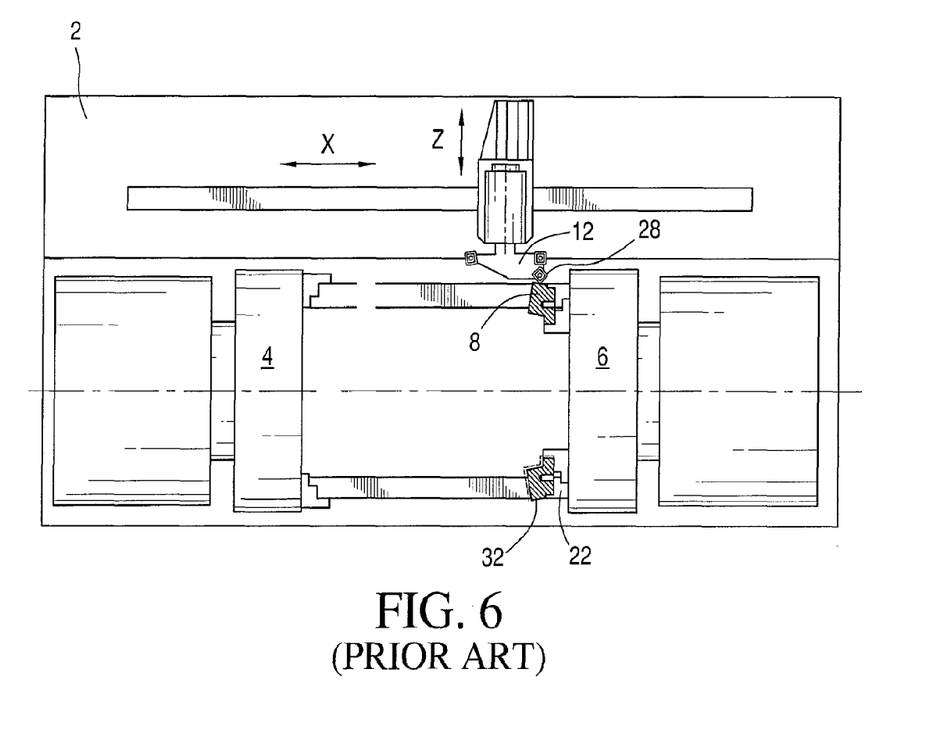
FIG. 6 shows the same arrangement as in FIG. 4 wherein the lower right insert is turning the front outside surface of the ring gear blank (back angle) with a second cutting edge of the insert.

In FIG. 4, the ring gear forging 8 has been transferred to and chucked in the right side chuck 22 on the right spindle 6. The universal tool holder 12 is repositioned via X, Z motions and uses the right upper insert 24 to turn the front inside surface 26 (front angle) of the ring gear blank 8. In FIG. 5 the lower right insert 28 is turning the front face 30 (face angle) of the ring gear blank 8. In FIG. 6 the lower right insert 28 is turning the front outside surface 32 (back angle) of the ring gear blank 8.

For the present invention, a "first chucking" for ring gears is considered to comprise those machining operations performed that produce bore and back face geometry on all part family members (e.g. turn the bore 16, back face 18, back outside diameter 20 and conduct drilling and tapping operations) as exemplified in FIGS. 1-3 (drilling and tapping not shown but may be performed on the same or a different machine). Usually, the first chucking operations are the same for all members of the part family as earlier discussed. The remaining operations (i.e. front machining operations) that usually produce different finished geometries on part family members (e.g. turning the front outside surface 32, front inside surface 26 and front face 30) are considered to be "second chucking" operations as exemplified in FIGS. 4-6.

With respect to the present invention and pinion family members, a "first chucking" is considered to comprise those machining operations performed that produce the same geometry (e.g. shank geometry) on all part family members. The remaining "front machining" operations that produce different finished geometries on pinion family members (e.g. turning of diameter and face angle of the pinion head, etc.) are considered to be "second chucking" operations.

Figure 7:
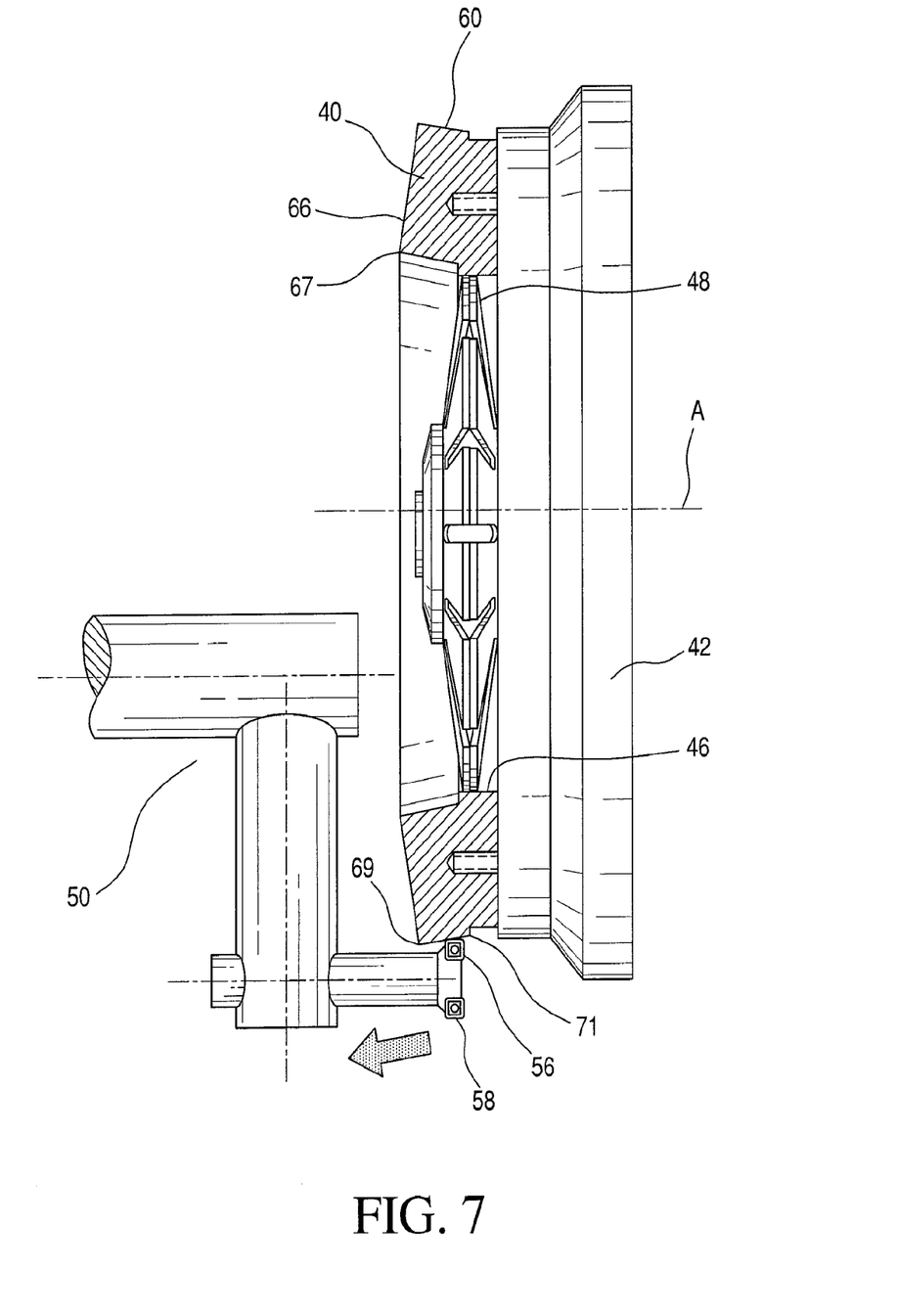
FIG. 7 shows a ring gear blank which only underwent the turning of the first chucking in a lathe (FIGS. 1 through 3). The partially turned ring gear blank is clamped on the work spindle of a 6 axis CNC bevel gear generator. The upper insert of the tool holder is turning the outside surface of the ring gear blank (back angle).
Figure 8:
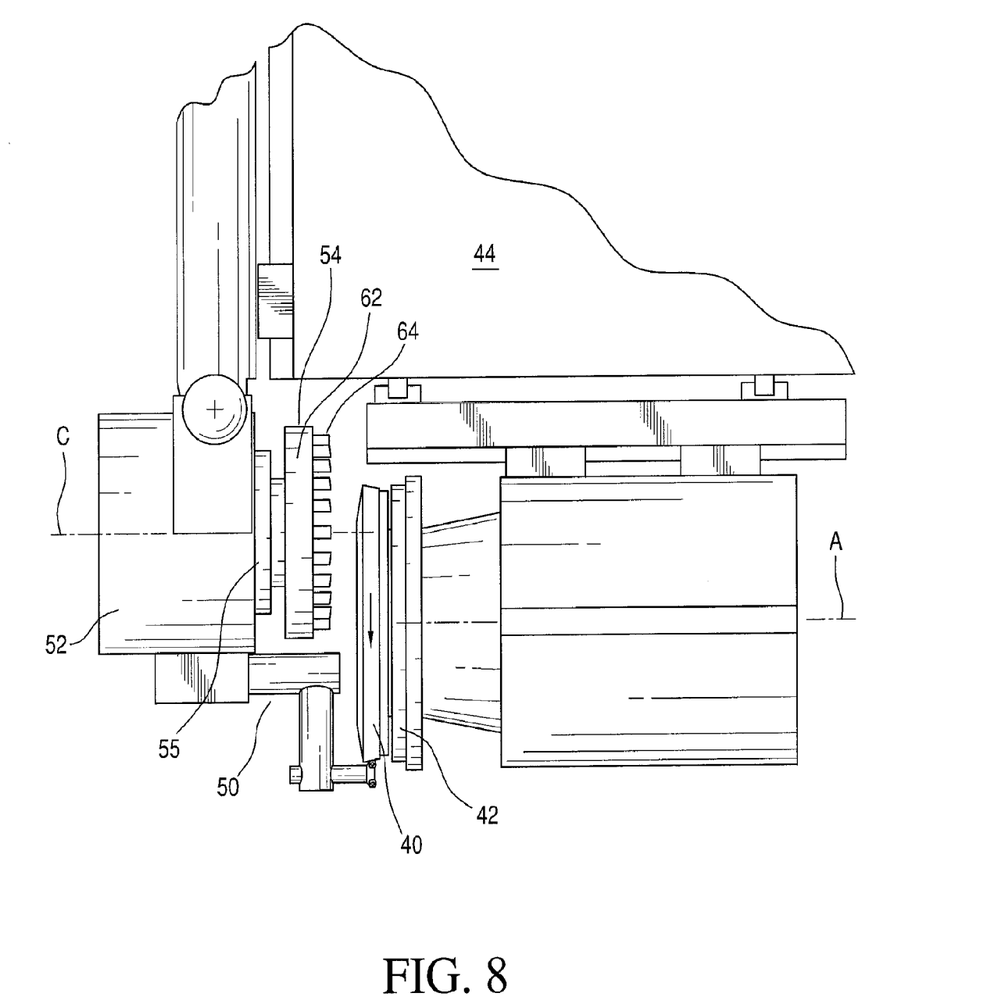
FIG. 8 shows a partial top view of a 6-axis bevel gear cutting machine which includes the tool holder for the turning operation as illustrated in FIG. 7.
Figure 15:
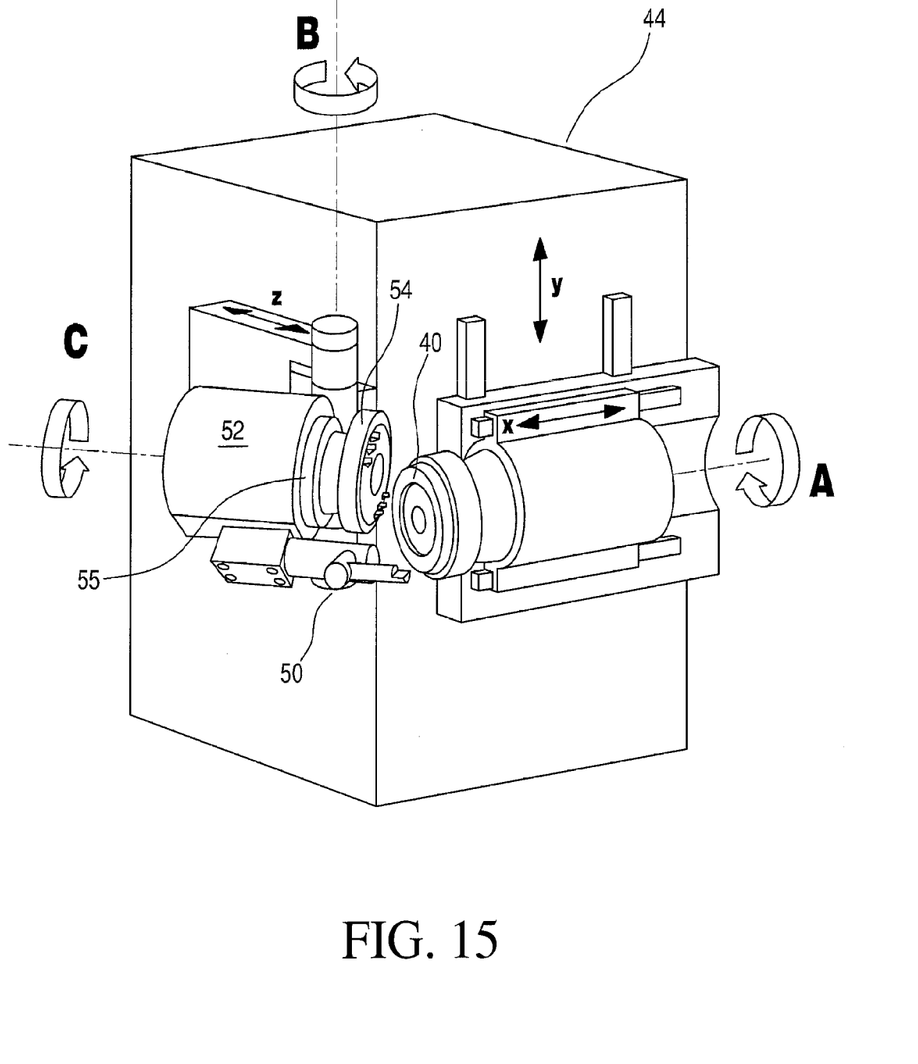
FIG. 15 shows schematic view of a six axis free form bevel gear cutting machine including the inventive turning tool holder.

The present invention is shown in FIG. 7 wherein a ring gear blank 40 which has been partially machined (e.g. turned) in a "first chucking" (FIGS. 1 through 3) on a lathe or machining center is clamped for rotation about axis A on the work spindle 42 of a multi-axis CNC bevel gear generating machine (preferably a six-axis CNC bevel gear generating machine 44 as shown in FIG. 15). Such machines are known and are described, for example, in U.S. Pat. Nos. 6,669,415; 6,712,566; 4,981,402 and 5,961,260 the disclosures of which are hereby incorporated by reference. The gear blank 40 is held (i.e. chucked) via its reference bore 46 by an expanding-type arbor 48. A tool holder 50 which is connected rigidly with a non-rotatable tool (e.g. cutter) spindle housing 52 (FIG. 8) allows for relative movements between tool holder 50 and the workpiece 40 in the same manner as relative movements between the workpiece 40 and tool 54 (FIG. 8). The tool holder 50 may have one or more inserts but preferably comprises two inserts 56, 58. In FIG. 7, the upper insert 56 is turning the front outside surface 60 (back angle) of the ring gear blank 40. The relative movement of the tool holder 50 versus the blank 40 is in the direction of the arrow.

FIG. 8 shows a 6-axis bevel gear cutting machine 44 which includes the tool holder 50 for a turning operation (as in FIG. 7) but with additional components of the bevel gear cutting machine. The upper insert 56 of the tool holder 50 is turning the front outside surface 60 (back angle) of the ring gear blank 40. Tool 54 is rotatable about tool axis C via tool spindle 55 residing within the tool spindle housing 52. The tool 54, comprising cutter head 62 and cutting blades 64 for the tooth cutting operation, is inactive during the turning operation.

Figure 9:
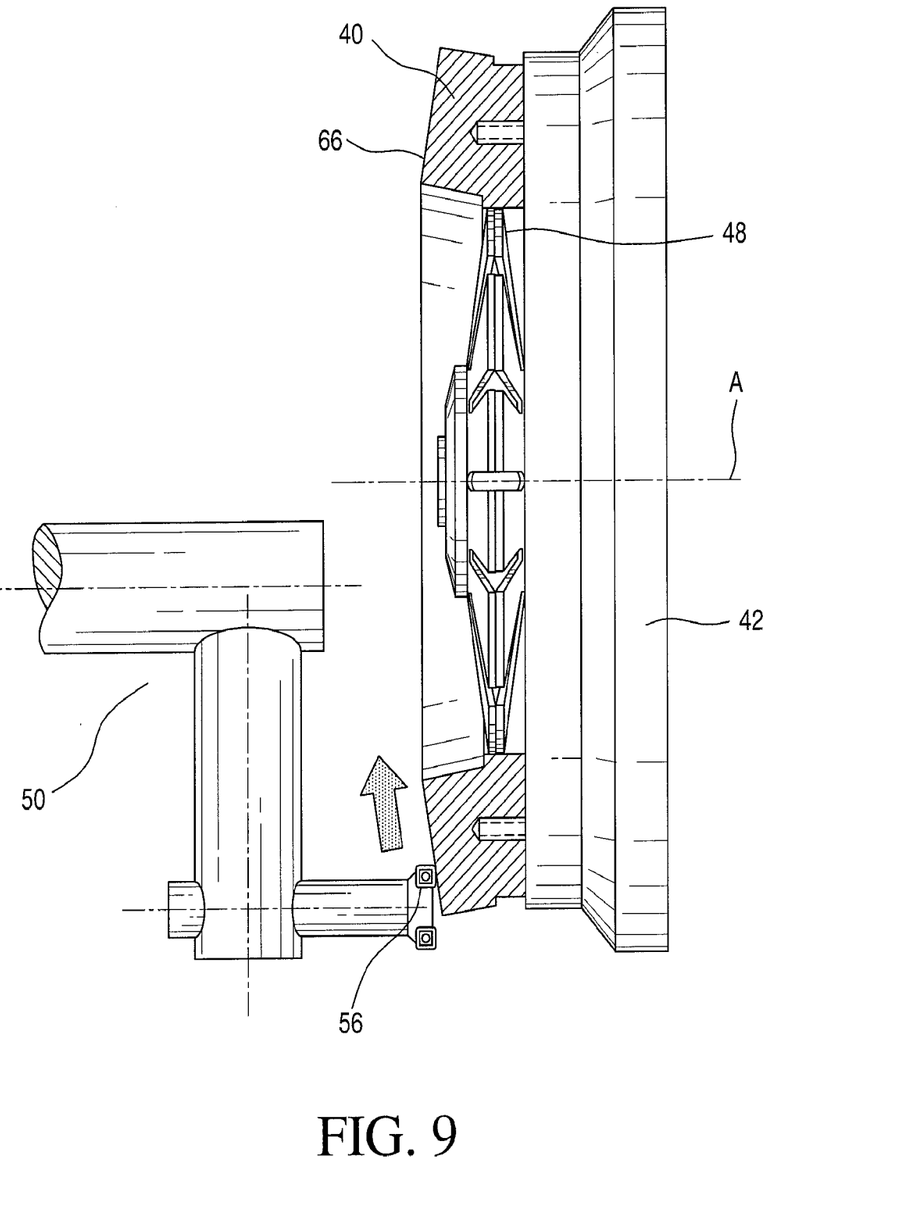
FIG. 9 shows a side view of a bevel gear cutting machine work spindle with the clamped ring gear blank wherein the front surface of the ring gear blank (face angle) is turned with the second cutting edge of the upper insert.

FIG. 9 shows the turning of the front surface 66 (face angle) of the ring gear blank 40 with another cutting edge of the upper insert 56. The relative movement of the tool 56 holder versus the gear blank 40 is indicated by the arrow.

Figure 10:
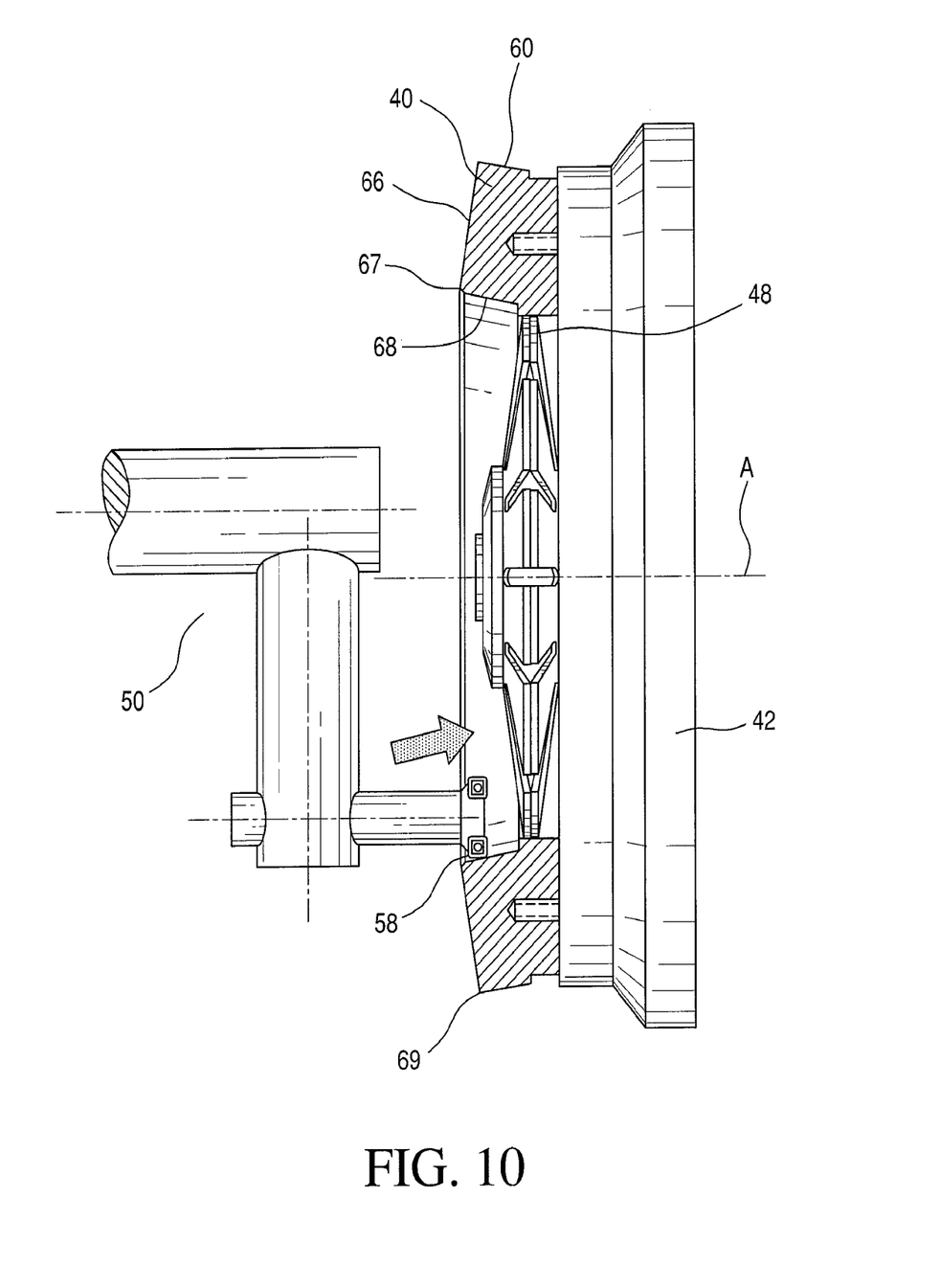
FIG. 10 shows a side view the bevel gear cutting machine work spindle of FIG. 9 wherein the front inside surface of the ring gear blank (front angle) is turned with the first cutting edge of the lower insert.

In FIG. 10, turning of the front inside surface 68 (front angle) of the ring gear blank 40 is performed with a cutting edge of the lower insert 58. The relative movement of the tool holder 50 versus the gear blank 40 is indicated by the arrow. Additionally, turning of corners such as those shown at 67 and/or 69 may be performed to produce desired facets or rounding.

Figure 11:
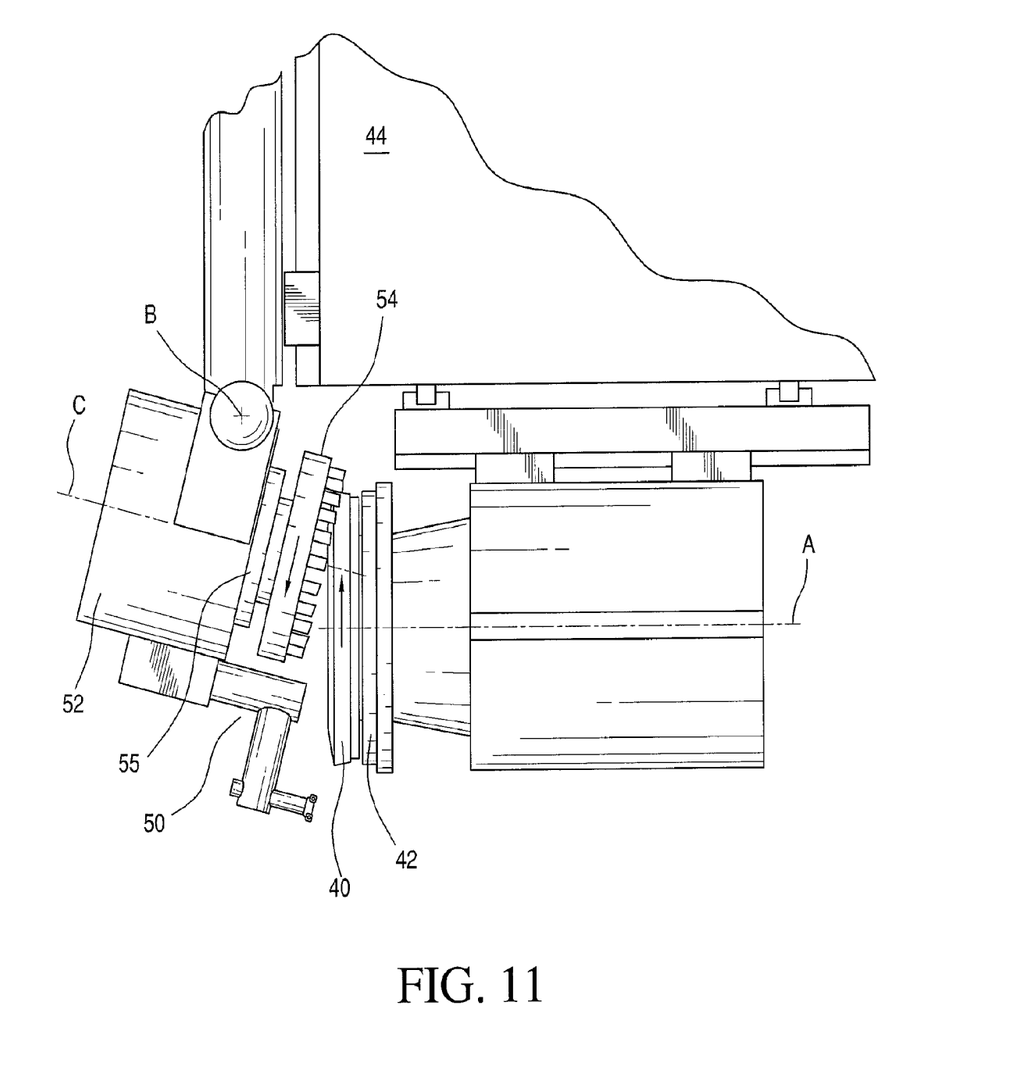
FIG. 11 shows a partial top view of a 6-axis bevel gear cutting machine which includes the tool holder for the turning operation wherein a bevel gear face cutter is performing a tooth cutting operation.

After turning of ring gear surfaces 60, 66 and 68 to final desired dimensions, the bevel gear face cutter 54 is positioned relative to the gear blank 40 to perform the tooth cutting operation as seen in FIG. 11. In this example of a ring gear with a right hand tooth spiral direction, the rotation of the ring gear blank 40 (i.e. counter clockwise) for tooth cutting (e.g.

continuous cutting method, face hobbing) is reversed versus the rotational direction of the gear blank 40 during turning operations (i.e. clockwise as seen FIG. 8). The direction of the cutter rotation is also indicated in FIG. 11. During the tooth cutting operation, the tool holder 50 and its inserts 56, 58 are inactive and are located clear of the ring gear blank and all machine components.

Figure 12:
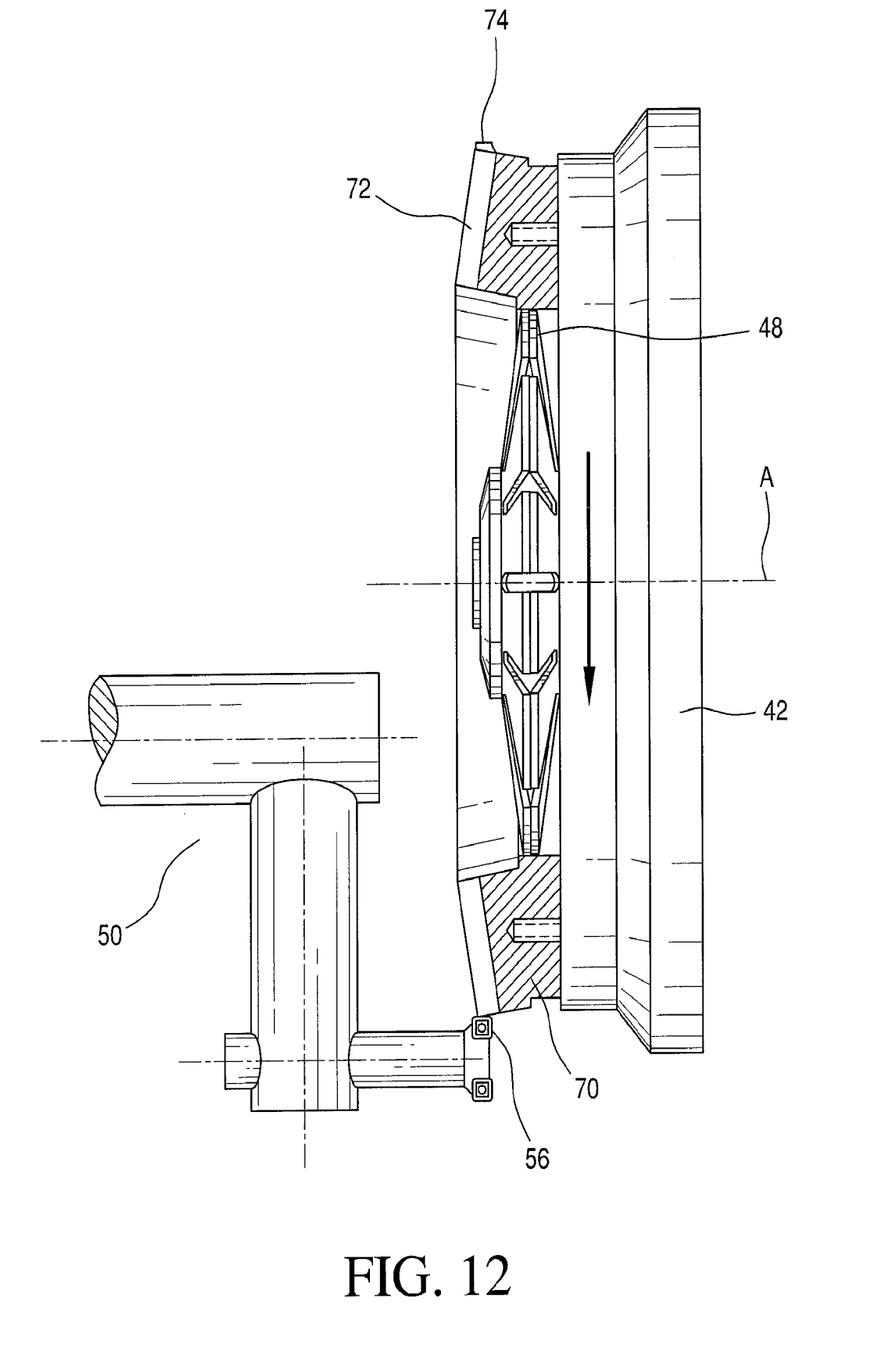
FIG. 12 shows a side view of a bevel gear cutting machine work spindle with a cut ring gear clamped thereon wherein the upper insert is utilized for a de-burring operation.
Figure 13:
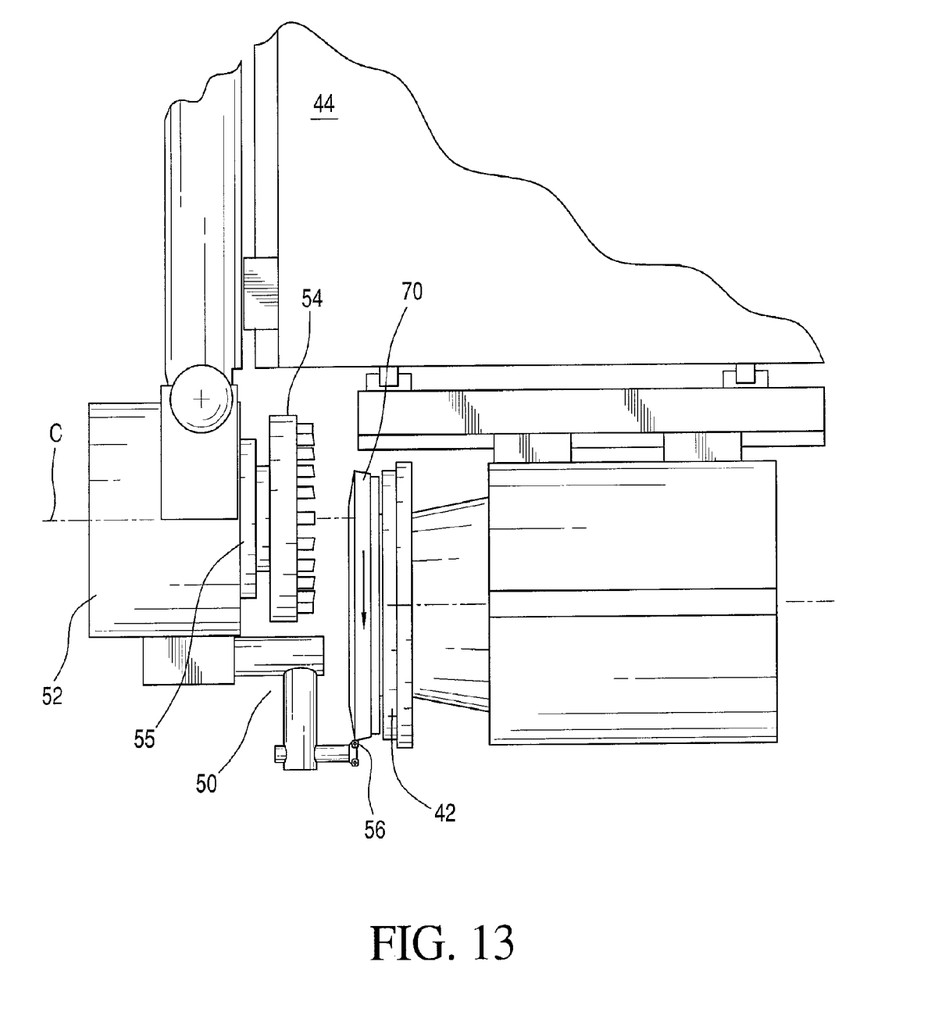
FIG. 13 shows a top view of a bevel gear cutting machine wherein the upper insert is utilized for the de-burring operation as shown in FIG. 12.

After cutting (FIG. 11) the ring gear blank 40 has become a gear 70 comprising teeth 72 as seen in FIG. 12. As a result of cutter rotation (FIG. 11) during tooth cutting (which is preferably directed from the inside to the outside across the gear face), a burr 74 is formed on the outside end of each tooth 72. In spiral bevel and hypoid gears, the end of the convex tooth flank forms an obtuse angle with the outside surface of the ring gear 70 and the end of the concave flank forms an acute angle with the outside surface of the ring gear 70. The burr 74 is generally formed only on the outside (heel) end of the concave flank, caused by the acute angle. After the tooth cutting operation, the tool holder 50 moves to the position shown in FIG. 12 or 13 and the insert 56 is able to remove the burr 74 caused by the tooth cutting with the rotational direction of the ring gear 70 as indicated in FIG. 12 or 13. In the case of a different spiral direction (i.e. left hand), the opposite rotational direction of the ring gear can be used if the insert has also cutting edges on the opposite side. The tool holder 50 with the insert 56 can move quickly in one position (just contacting the outside diameter of the ring gear) in order to scrape off the burr 74 preferably with the long side of the insert 56 (not using one of the pointed corners) thereby scraping from the tooth slot in the direction of the concave flank.

Alternatively, the tool holder 50 with insert 56 may move in the position shown in FIG. 7 thereby repeating turning of the front outside surface 60 in the area of the tooth depth. In both cases, using the side of the insert or the pointed corner, the cutting edge orientation and the hand of rotation of the ring gear should provide a cutting action from the tooth slot towards the concave flank of the tooth. To assure proper relief angle below the cutting edge of an insert, the cutting edge has an offset extending generally perpendicular to the drawing plane. In case the direction of part rotation is opposite during deburring than during cutting (where inserts with cutting edges on top and bottom are utilized), the offset has to be changed in the opposite direction in order to create again the proper relief angle for deburring.

Figures 14A, 14B:
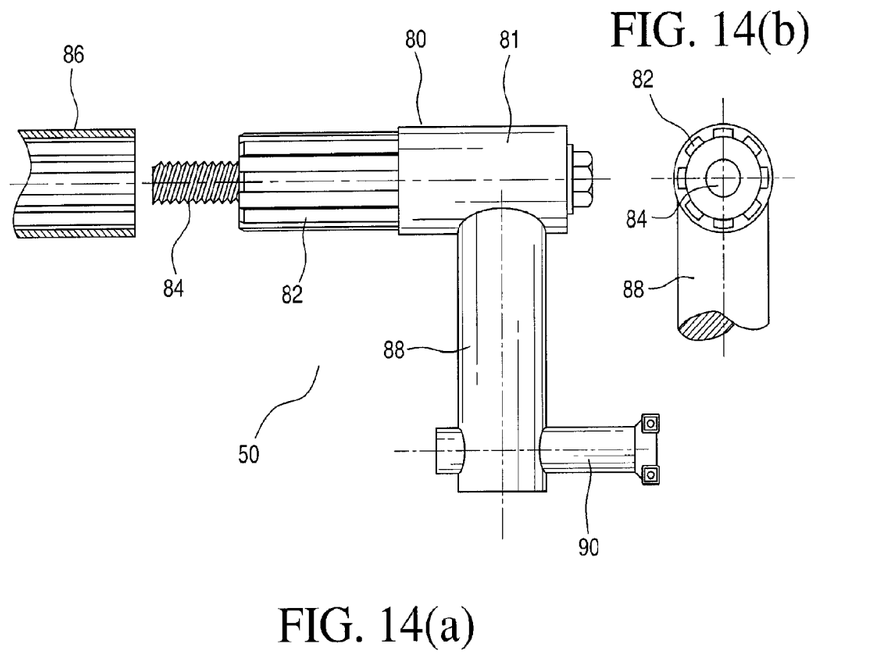
FIG. 14(a) shows a tool holder according to the invention comprising an exchangeable center portion with a spline and bolted connection to a stationary back post (left).
FIG. 14(b) shows a front view onto the spline.

FIGS. 14(*a*) and 14(*b*) show elements of tool holder 50 comprising an exchangeable front part 80 having a primary arm 81 with a spline 82 and bolt 84 for connection to a stationary back post 86. Front part 80 additionally includes spacing arm 88 and insert arm 90 both of which may be interchangeable for various sizes (i.e. lengths). The back post 86 is preferably rigidly connected to the bevel gear cutting machine 44 such as in or adjacent to the tool spindle housing 52 (FIG. 15). FIG. 14(*b*) shows a front view onto the spline 82. The interchangeability allows a wide range of different parts (size and design) to be accommodated. It also enables the proper size of tool holder 50 to be provided in order to avoid interference with machine components. The tool holder 50 may be of a one-piece design or may consist of several parts (e.g. 81, 88 and 90). Those parts can be combined in a building block scheme by the user of the equipment or especially designed by the machine manufacturer.

Alternatively, tool holder 50 may be advanced or retracted (e.g. telescopically) with respect to the gear cutting machine 44 via hydraulic, pneumatic, electric, manual or other means. Tool holder 50 may be capable of swinging from a "park" position to a turning position around a pivot axis or use a trapezoidal or other linkage to move between a park and operating position. Preferably, in the operational position, primary arm 81 and insert arm 90 are each oriented parallel to tool axis C while spacing arm 88 is preferably oriented perpendicular to the orientation of primary arm 81 and insert arm 90. It is also possible to attach a plurality of tool holders to a gear cutting machine which may comprise a combination of different rigid, retractable and/or swing type tool holders.

FIG. 15 represents a three-dimensional view of a six-axis free form bevel gear cutting machine with three rectilinear axes X, Y and Z as well as thee rotational axis A (work spindle rotation), B (tool spindle pivot axis) and C (tool axis rotation). Attached to the cutter spindle housing is the tool holder post 50. This preferred arrangement enables utilization of four axes of the machine (X, Y, Z and B) to position the tool holder 50 relative to the gear blank 40 (or cut gear 70) for the turning (or deburring) operation. Axis A (work rotation) is also utilized in order to rotate the gear blank (or gear) for the turning (or deburring) operations.

The freedoms, accuracy and stiffness of a bevel gear generator are generally greater than CNC lathes designated to turn the same size parts. According to the inventive method, the chucking on a bevel gear generator replaces the second chucking (and handling) on a lathe or machining center, and, the handling and chucking on the bevel gear generator with only one chucking on the bevel gear generator. Chucking on a bevel gear generator is very accurate, usually accomplished with a high precision disk spring expander, which will assure minimal run out between the ring gear bore and back face (formed in first chucking in a lathe) and the face cone. The run out quality is not always given with respect to lathes because the second chucking is generally done with a three jaw chuck which does not guarantee high run out quality.

Preferably, the bevel cutting machine 44 executes two or more connected part programs. For example one for the turning operation, one for the bevel gear cutting and one for the deburring. The turning and/or deburring programs may receive information from the part drawing (ring gear or pinion) as well as information about the tool holder (dimensions of combined elements) as input data. Depending on the required accuracy of the turning operation, a gaging of the turning tool can be required. The gaging is possible utilizing special gaging equipment (off the machine) or in the machine using gage bars, gage disks or even a master blank.

When processing gear blanks according to the present invention, all gears of one part family (having already been machined in a first chucking) can be front machined to a desired blank dimension and cut to provide a teeth of a desired number and geometry as a "last minute" decision given the flexibility of the inventive method and machine. Therefore, the amount of part inventory, and hence cost, can be greatly reduced.

In operation, for example, with a tool holder and gear blank of the type as shown in FIGS. 7 through 15, a machining process may be performed by the following steps:

The gear blank 40 is loaded and chucked on the work spindle 42.

The machine axes X, Y, Z and B (see FIG. 15) move from their load position, preferably in a rapid move, to a position where the upper insert 56 with its left corner is behind the front outside surface 60 (i.e. to the right of corner 71 in FIG. 7).

The work spindle 42 starts rotating at a predetermined speed (RPM) in order to archive sufficient surface speed for the turning operation. The machine axes X and Z move simultaneously in a linear interpolation relationship whereby the left corner of the upper insert 56 removes chips along the outside surface 60. The turning motion is carried out with a feed motion that provides a common turning feed rate to a position which over travels the outside surface 60 slightly in order to finish turning the outside surface 60 and to position the right corner of the upper insert 56 in the starting position for turning, if desired, a facet at the corner 69 between outer surface 60 and front surface 66.

The machine axes X and Z move simultaneously in a linear interpolating relationship (while the right corner of the upper insert 56 is turning a facet between outside surface 60 and front face 66) to a position that is the staring point for the front surface 66 turning (with the same right corner of the upper insert 56).

The machine axes X and Z move simultaneously in a linear interpolating relationship so that the right corner of the upper insert 56 turns the front surface 66 of the gear blank 40. Because of the diameter change during this turning step, the spindle RPM may be changed between the beginning and the end of the front face turning in order to achieve an acceptable turning surface speed. It is also possible to change the RPM constantly in a linear relationship to the actual turning diameter in order to achieve an optimal turning surface speed. During turning of the front face 66, the relief angle between the insert 56 and the conical front face 66 is different then it was during turning of the outside surface 60. A different offset in a direction perpendicular to the drawing plane (Y-direction of gear cutting machine) can be used to reestablish a sufficient relief angle. The offset change can be accomplished during the facet turning as described above. This requires a Y-axis value which simultaneously changes, in an interpolating mode together with the X- and Z-axes while the facet is being turned. While the cutting corner of the insert 56 moves from the outside diameter to the inside diameter and turns the front face 66, the offset Y may simultaneously change in order to maintain an optimal cutting insert relief angle. The turning of this step requires an over travel because the following turning step requires a change of the active cutting edge and insert.

The machine axes then move, preferably in a fast motion, to a new X, Y and Z position (the Y position provides optimal relief angle of the insert during the turning operation of the facet and the front inside surface. The right corner of the lower insert 58 may now be used to produce a facet at the corner 67 between the front face 66 and the front inside surface 68 of the gear blank 40. The machine axis X and Z move simultaneously in an interpolating mode to the end position of the facet (the Y axis may also change to maintain an optimal insert relief angle). The work spindle RPM is selected to provide optimal turning surface speed.

The machine axes X and Z then move simultaneously in a linear interpolating relationship whereby the right corner of the lower insert 58 is utilized to turn the front inside surface 68 of the gear blank 40. Because of the diameter change during this turning step, the spindle RPM may be adjusted to a speed between the beginning and the end of the front inside turning to achieve an acceptable turning surface speed. It is also possible to change the RPM constantly in a linear relationship to the actual turning diameter in order to achieve an optimal turning surface speed.

The machine axes X, Y, Z and B are then moved from their front inside 68 turning end position, preferably in a rapid move, to an indexing position. This is the position that presents the cutter 54 to the gear blank 40 at the beginning of the tooth cutting process. In the present example, the gear blank 40 is cut with a face hobbing cutter head 54 in a non-generating continuously indexing operation (FIG. 11) to produce a gear 70 (FIG. 12). This requires the cutter head 54 and the gear blank 40 to rotate in the directions as shown by the respective arrows in FIG. 11. The cutting in this example requires a feed motion of the cutter 54 into the gear blank 40 material to a full depth position. The feed motion is usually achieved by simultaneous movements of the axes X, Y and Z and in some processes requires an additional B-axis rotation. However, in the present example at least an X-axis movement is required to achieve tool feeding.

The machine axes X, Y, Z (and possibly B) move in order to withdraw the cutter 54 from the tooth slots 72 and, preferably, return to the indexing position. The rotation of the cutter 54 is stopped and the rotation of the work spindle 42 is reversed. Then the machine axis X, Y, Z and B move from the indexing position, preferably via a rapid move, to a deburring position as shown in FIG. 12 and rest in that position for at least one revolution of the gear 72 while the long edge of the upper insert 56 scrapes the burr 74 off the teeth 72. The Y-axis offset in this step is chosen to provide optimal condition for the scraping action. It is also possible (instead the rapid move from the indexing position to the deburring position) to move from the indexing position in a rapid move to a certain distance near to the deburring position shown in FIG. 12 and then with a reduced speed to the final deburring position shown in FIG. 12.

The machine axes X, Y, Z and B are then moved from the deburring position into their initial load position preferably in a rapid move. The rotation of the work spindle 42 stops.

The finish cut and deburred gear 72 is de-chucked and unloaded.

In the present invention, the turning process may be performed wet or dry although dry turning is preferred. The cutting edges utilized on the tool holder are preferably inserts (e.g. carbide) but may be brazed on or solid tool material. Additionally, it should be understood that turning steps (all or only individual steps) may have to be repeated one or more times if the stock to remove is high in certain areas. In addition to the axes X, Y and Z, the machine B axis can be utilized to position and move the turning tool during the turning operation.

It is preferable for chip lengths to be short so as to not cause problems during their removal utilizing the chip conveyor of the gear cutting machine. The chips can be controlled in their winding diameter and length using appropriate tool angles and feed rates as is known to the skilled artisan. Alternatively, the inventive process proposes short feed interruptions (i.e. pulse feeding).

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of machining a bevel gear blank workpiece to produce a bevel gear on a machine including a workpiece spindle rotatable about a workpiece axis of rotation, a tool spindle rotatable about a tool axis of rotation with said tool spindle residing in a tool spindle housing with said tool spindle housing being non-rotatable about said tool axis of rotation, said workpiece spindle and said tool spindle being translatable with respect to one another in up to three different directions, said workpiece spindle and said tool spindle being angularly movable with respect to one another about at least one pivot axis, and a tool holder mounted to the outside surface of said non-rotatable tool spindle housing, said tool holder comprising one or more non-rotary metal turning tools, the method comprising:

mounting a rotatable cutter head comprising cutting blades on said rotatable tool spindle;

mounting a bevel gear blank workpiece on said workpiece spindle;

moving said tool spindle housing and said tool holder together relative to said workpiece spindle along at least one of said up to three different directions and/or about said at least one pivot axis to engage said one or more non-rotary metal turning tools with said blank workpiece;

machining one or more predetermined surfaces of said blank workpiece with said non-rotary metal turning tools, rotating said cutter head comprising cutting blades on said rotatable tool spindle, bringing said rotating cutter head comprising cutting blades into engagement with said blank workpiece to form one or more teeth in said blank workpiece to produce a bevel gear.

2. The method of claim 1 further comprising engaging said one or more non-rotary metal turning tools with the said one or more teeth of said bevel gear to remove burrs resulting from the tooth forming step.

3. The method of claim 1 wherein said one or more non-rotary metal turning tools comprise inserts.

4. The method of claim 1 wherein said bevel gear blank workpiece comprises a ring gear blank having a rear surface, a front surface on an opposing side of said ring gear than the rear surface, a front outside surface, and a front inside surface, wherein the front surface is located axially farther from said workpiece spindle than the rear surface of said ring gear along the workpiece axis of rotation, the front inside surface is located radially closer to the workpiece axis of rotation than the front outside surface of said ring gear, and at least one of said front outside surface, said front surface, and said front inside surface are machined by said one or more non-rotary metal turning tools.

5. The method of claim 1 wherein said bevel gear blank workpiece comprises a pinion blank having a diameter and a face angle, wherein at least one of said diameter and said face angle are machined by said one or more non-rotary metal turning tools.

* * * * *